United States Patent
Miller et al.

(10) Patent No.: US 10,418,839 B2
(45) Date of Patent: Sep. 17, 2019

(54) ATTACHABLE PORTABLE POWER CHARGER WITH WIRELESS AND DIRECT CHARGING CONNECTIVITY

(71) Applicant: Halo2Cloud LLC, Hartford, CT (US)

(72) Inventors: Garold C. Miller, Hartford, CT (US); Nathan Daniel Weinstein, Hartford, CT (US)

(73) Assignee: Halo2Cloud LLC, Hartford, CT (US)

( * ) Notice: Subject to any disclaimer, the term of this patent is extended or adjusted under 35 U.S.C. 154(b) by 199 days.

(21) Appl. No.: 15/488,871

(22) Filed: Apr. 17, 2017

(65) Prior Publication Data

US 2017/0302098 A1  Oct. 19, 2017

Related U.S. Application Data

(60) Provisional application No. 62/322,954, filed on Apr. 15, 2016.

(51) Int. Cl.
| | |
|---|---|
| *H01M 10/46* | (2006.01) |
| *H02J 7/02* | (2016.01) |
| *H02J 7/00* | (2006.01) |
| *H02J 50/10* | (2016.01) |

(52) U.S. Cl.
CPC ............ *H02J 7/025* (2013.01); *H02J 7/0042* (2013.01); *H02J 7/0054* (2013.01); *H02J 50/10* (2016.02); *H02J 2007/0062* (2013.01)

(58) Field of Classification Search
CPC .......... H02J 7/0042; H02J 7/355; H02J 7/025; H02J 5/005; H02J 2007/0062

USPC .......................... 320/107, 108, 111, 114, 115
See application file for complete search history.

(56) References Cited

U.S. PATENT DOCUMENTS

| | | |
|---|---|---|
| D296,440 S | 6/1988 | Smith et al. |
| D537,036 S | 2/2007 | Chen |
| D587,267 S | 2/2009 | Wang |
| D662,050 S | 6/2012 | Tien |
| D662,878 S | 7/2012 | Fahrendorff et al. |
| D672,309 S | 12/2012 | Tien |
| D674,748 S | 1/2013 | Ferber et al. |
| D677,261 S | 3/2013 | Hsu et al. |
| D686,153 S | 7/2013 | Qu |
| D692,375 S | 10/2013 | Mamane |
| D692,826 S | 11/2013 | Aida et al. |
| D695,214 S | 12/2013 | Roberts et al. |

(Continued)

*Primary Examiner* — Edward Tso
(74) *Attorney, Agent, or Firm* — McCormick, Paulding & Huber LLP

(57) ABSTRACT

A portable power charger is provided for charging one or more electronic devices from a rechargeable internal battery. The portable power charger is attachable to the surface of an electronic device via an attachment means located on the charger housing. The portable power charger includes at least one power connection for connecting the charger with an external power source, or at least one electronic device, or both, for direct charge connectivity. The power connection can be a power connection port or a power connector cable, attached to the charger housing, each capable of acting as a power input, a power output, or both. The portable charger also includes wireless power transmission components, such as a transmitter and a receiver, for recharging the charger as well as electronic devices via wireless power transmission methods.

22 Claims, 9 Drawing Sheets

(56) References Cited

U.S. PATENT DOCUMENTS

| | | | |
|---|---|---|---|
| D700,139 S | 2/2014 | Chan et al. | |
| D704,626 S | 5/2014 | Li | |
| D705,782 S | 5/2014 | McParland et al. | |
| D709,026 S | 7/2014 | Lee et al. | |
| D713,785 S | 9/2014 | Tehrani | |
| 9,197,087 B2 * | 11/2015 | Lai | H02J 7/0044 |
| D749,596 S | 2/2016 | Khodapanah et al. | |
| D765,070 S | 8/2016 | Franklin | |
| D776,050 S | 1/2017 | Awad et al. | |
| D782,974 S | 4/2017 | Ju | |
| D789,358 S | 6/2017 | Yang et al. | |
| 9,689,527 B2 | 6/2017 | Franklin | |
| D791,697 S | 7/2017 | Precheur | |
| D792,416 S | 7/2017 | Tsai | |
| D804,411 S | 12/2017 | Lentine | |
| 2006/0052144 A1 | 3/2006 | Seil et al. | |
| 2010/0078536 A1 | 4/2010 | Galvin | |
| 2010/0294818 A1 | 11/2010 | LaFargue et al. | |
| 2011/0291614 A1 | 12/2011 | Yeh | |
| 2013/0026983 A1 * | 1/2013 | Yamamoto | H02J 7/0055 320/108 |
| 2013/0082543 A1 | 4/2013 | Tang | |
| 2013/0150134 A1 | 6/2013 | Pliner et al. | |
| 2013/0307470 A1 | 11/2013 | Watanabe et al. | |
| 2013/0320913 A1 * | 12/2013 | Chen | H02J 7/0042 320/103 |
| 2014/0111159 A1 | 4/2014 | Siminoff et al. | |
| 2014/0132206 A1 | 5/2014 | Zhu | |
| 2015/0015196 A1 | 1/2015 | Ormesher et al. | |
| 2016/0003270 A1 | 1/2016 | Franklin | |
| 2016/0072338 A1 | 3/2016 | Makwinski et al. | |
| 2016/0111692 A1 | 4/2016 | Morita et al. | |

\* cited by examiner

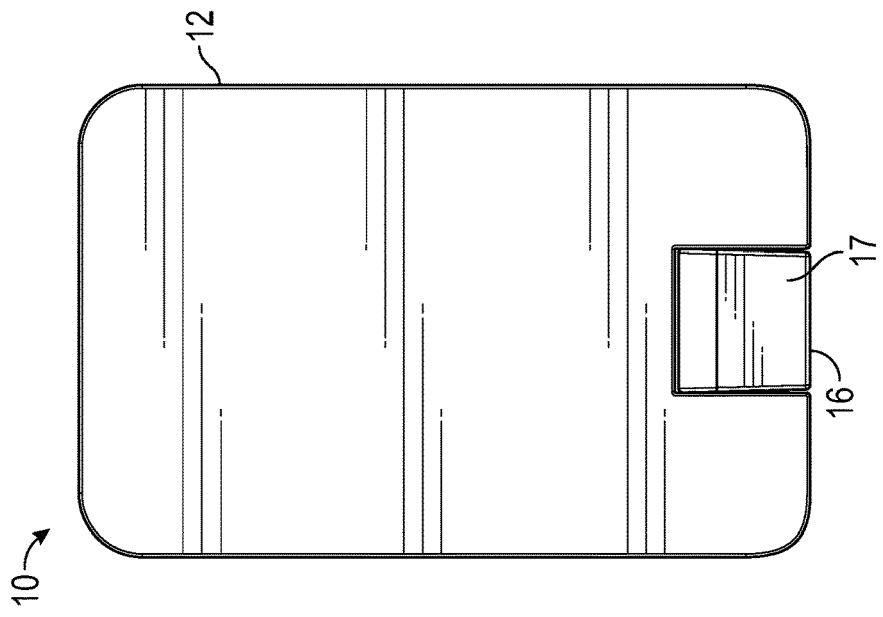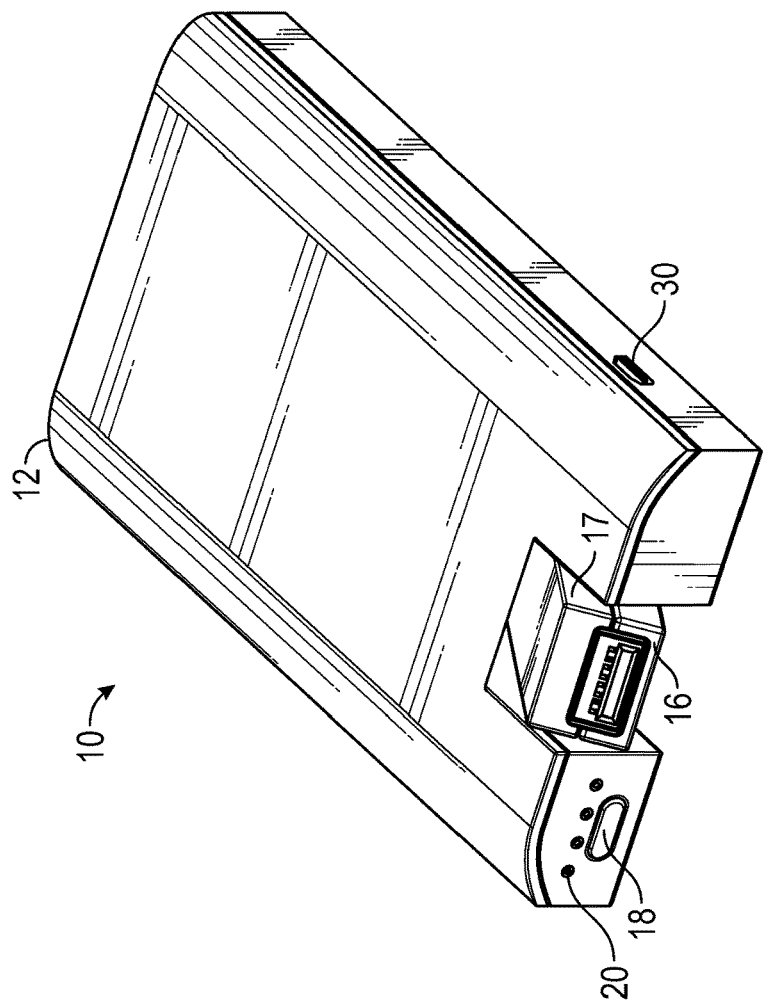

ATTACHABLE PORTABLE POWER CHARGER WITH WIRELESS AND DIRECT CHARGING CONNECTIVITY

CROSS-REFERENCE TO RELATED APPLICATION

This application claims the benefit of U.S. Provisional Application No. 62/322,954, filed Apr. 15, 2016, which is incorporated herein by reference.

FIELD OF INVENTION

The present invention generally relates to a power charging apparatus, and more particularly relates to a portable power charger for attaching to and charging mobile electronic devices in a variety of manners, including via direct connection or via wireless power transmission.

BACKGROUND OF THE INVENTION

Present day consumers typically own several electronic devices specifically designed for portability and on-the-go use, including, for example, a mobile phone or smart phone, a portable music player like an iPod® or an MP3 player, a tablet, a portable gaming unit, a camera, and the like. Each of these devices requires frequent recharging. Such electronic devices typically utilize a cable for connecting the device to a power source, such as a wall outlet, a car charger, an airplane charger, or a computer. However, a separate cable is usually required for each power source. Moreover, different electronic devices often utilize different connection ports and interfaces such that a single charging cable is not compatible with multiple devices. Accordingly, a tech-savvy consumer, with several electronic devices, will usually have multiple charging cables to keep track of. Even then, the consumer may be without sufficient power to recharge a phone due to bad weather or a power outage, or may not always be in a place where a power source is readily available, or even if so, may not have the appropriate cable or adapter available to use with a particular power source.

With traditional power sources, such as those noted above, it is often difficult to charge multiple devices at the same time, especially where each device requires a separate charging cable. For example, a car charger port may only handle a single cable at a time. Adaptor devices are available on the market for connecting multiple devices to a power source at the same time—for example, a two-to-one or three-to-one car charger splitter. However, such adapters are often only compatible with certain interfaces. Moreover, such adapters are separate from portable power sources and tend to be bulky.

Similarly, connection interface attachments are also available for adapting a charging cable for use with a variety of devices for recharging from a power source, each requiring a different interface connection. However, such attachments are usually separate small pieces, and therefore difficult to keep track of when not in use. Further, use of such attachments does not solve the problem presented by the need to charge multiple devices at the same time, from the same power source, as oftentimes, only one attachment can be used with a charging cable at a time.

Portable power chargers exist that permit recharging of electronic devices when a standard power source is not readily available. For example, portable power chargers are illustrated and described in co-pending U.S. application Ser. No. 13/682,985, filed Nov. 21, 2012, which shares common inventors with the present application and which is incorporated herein by reference. Some existing power charger devices usually cannot charge multiple devices at the same time, either due to limited capacity or connectivity options. Even if multiple devices may be attached to the power charger at the same time, the charger may prioritize how the devices are recharged—i.e., it will charge one device first and then the second, and so on. However, this approach takes a long time to recharge all devices and risks not having sufficient charge remaining in the charger for fully charging the second device.

Further, some portable charger devices will not permit recharging from the charger when the charger is itself being recharged or connected to an external power source. Such devices require the charger unit to be disconnected from a power source before a charge will be passed on to a device connected to the charger, or require the charger unit to be fully charged first before any device connected to the charger unit can then be recharged.

In addition, portable power chargers generally remain separate from and unattached to electronic devices when the portable power chargers are not in use and are only connected to electronic devices via cables and adapters when recharging the electronic devices. This means that the portable power charger must be carried separately from and in addition to the electronic device when not in use so that it is available when needed to charge the electronic device. Even when the portable power charger is connected to an electronic device via cable and/or adapter for charging, carrying both the portable power charger and the electronic device in one's hands simultaneously is awkward and unwieldy, and the charging cable can be easily disconnected from the charger and/or the device.

Wireless power chargers have been introduced to the market, especially for mobile electronic devices, that have provided additional approaches to recharging portable electronic devices. Such wireless power transmission devices have been developed in connection with wireless charging standardization efforts, including by the Wireless Power Consortium (WPC), which have led to the adoption of devices that permit recharging of electronic devices without the use of separate chargers for each device. More particularly, the WPC has introduced the Qi wireless charging standard. Qi, which translates to "vital energy," takes its name from the Chinese concept of intangible flow of power and utilizes magnetic coil induction to transmit a charge from a transmitter to a receiver via a magnetic field.

Commonly, a wireless power transmission device utilizing magnetic coil induction includes a charging mat that must be connected to an external power source, such as a wall socket or a car charger socket, in order to transmit power wirelessly. The charging mat includes a transmitter having an induction coil. When a current is passed through the transmitter coil, a magnetic field is generated and transmitted to an electronic device placed on the charging mat. Such a device, in order to be wirelessly charged via the charging mat, must include a receiver having an induction coil, typically connected to the internal battery of the electronic device. When the electronic device is placed on an energized charging mat in a particular location, the receiver receives the wirelessly transmitted power in the form of a magnetic field, which induces a voltage in the receiver coil that can be used to power the electronic device or charge the internal battery of such a device.

Various drawbacks of prior art wireless power chargers have been identified. For example, such wireless chargers are not easily portable and require direct connection to an external power source for operation. Such external power sources are often not readily available, which makes the charger useless for on-the-go use. Additionally, some charging mat designs are often too small to be able to charge more than one electronic device at the same time. As noted, some wireless charging mats require a device to be placed in a particular spot—e.g., a Qi spot—where the transmitter and receiver coils must be aligned in order for a charge to be transmitted. If the devices are not properly aligned, there may be no charging. Increasing the size of the charging mat may be undesirable, as it may take up too much space or be aesthetically unpleasing.

In view of the foregoing, there is a need for a charger that can be used to charge a variety of electronic devices, including but not limited to smart phones, mobile phones, data tablets, music players, cameras, camcorders, gaming units, e-books, Bluetooth® headsets and earpieces, GPS devices, and the like, either individually or simultaneously in various combinations. Additionally, there is a need for such a charger that is portable, has a compact size, is attachable to an electronic device for easy carry and use with the electronic device, and further is easy to use in various conditions and locations to charge one or more electronic devices simultaneously, including but not limited to in a house or office, a car or an airplane, as well as on-the-go, without compromising operation and performance. Further, there is a need for a portable charger that is easily attachable to and detachable from an electronic device allowing for convenient and hands free charge and carry. Still further, there is a need for a portable charger having a power connection port that can act both as an input port for recharging an internal battery unit in the charger and an output port for recharging an electronic device connected to the charger. Still further, there is a need for a portable charger that can be recharged from an external power source or from a wireless power transmission device, providing increase flexibility and convenience of use for the portable charger. Still further, there is a need for a portable charger that can recharge its internal battery from an external power source or a wireless charging device at the same time as an electronic device connected to the charger, either directly or wirelessly, is being recharged by or via the charger unit. Still further, there is a need for a portable charger unit in a compact size that has increased functionality for a user requiring a portable source of power. Accordingly, it is a general object of the present invention to provide a portable charger that improves upon conventional power chargers currently on the market and that overcomes the problems and drawbacks associated with such prior art chargers.

SUMMARY OF THE INVENTION

In accordance with the present invention, a portable power charger is provided for charging one or more portable electronic devices. In general, a portable power charger includes a charger housing having a rechargeable battery unit disposed therein for connecting to and recharging one or more electronic device, as necessary, and may also include wireless power transmission components, such as a transmitter and a receiver, for recharging the charger as well as electronic devices via wireless power transmission methods. The portable power charger may also include at least one power connection port for connecting the portable power charger with an external power source, or at least one electronic device, or both. Similarly, the portable power charger may also include at least one connector cable interface for connecting the portable power charger with an external power source, or at least one electronic device, or both.

In addition, in accordance with an aspect of the present invention, the portable power charger includes an attachment means for attaching the portable power charger to the surface of an electronic device so that the portable power charger and the electronic device can be carried by the user as one unit. Additionally, the attachment of the portable power charger directly to the electronic device facilitates and improves the charging of the electronic device, either by direct charging connection, or by wireless charging, in accordance with embodiments of the present invention.

In an embodiment of the present invention, the portable power charger is attachable to an electronic device via an attachment means comprising an adhesive patch that when pressed against the surface of an electronic device allows for hands free carry and charge. The adhesive patch allows the portable power charger to remain stuck to the electronic device while charging but also allows for seamless removal when the charge is completed by pulling the portable power charger apart from the electronic device. The portable power charger comprises a charger housing with at least one power connection port interface that can function as a power input, a power output, or both. A rechargeable internal battery is disposed within the charger housing and is operatively connected with the power connection port interface for relaying an electrical charge from an external power source for recharging the internal battery when the portable power charger is connected to the power source via the power connection port (acting as a power input) and/or for charging other electronic devices from the internal battery via the power connection port (acting as a power output). The charger unit is portable as a result of the small size of the housing. Despite the small size of the unit, the power capacity is very high so that the charger can accommodate multiple electronic devices at the same time.

In alternative embodiments of the present invention, the portable power charger is attachable to an electronic device via an attachment means comprising one or more suction cups that, when pressed against the surface of an electronic device, attach the portable power charger to the electronic device allowing for hands free carry and charge and seamless removal when the charge is completed. In other embodiments, the portable power charger unit is in the form of a case for an electronic device, e.g., a mobile phone case, and attaches to the electronic device via a snap fit connection when the device is put inside the case. In other embodiments, the portable power charger is attachable to an electronic device via various other attachment means, including, clips or hook-and-loop connection or any known means of attaching objects together.

In embodiments of the present invention, the portable power charger can include a wireless transmitter operatively connected to the internal rechargeable battery for transmitting a power charge to an electronic device having a wireless receiver. The portable power charger may further include a wireless receiver operatively connected to the internal battery for receiving a power charge from a power source having a wireless transmitter. In embodiments of the portable power charger including both a wireless transmitter and a wireless receiver, the portable power charger can both be charged wirelessly, for example, when placed on a wireless power transmission device (e.g., wireless charging mat), and charge other devices wirelessly, for example, when a device is placed on the charger housing.

In embodiments of the present invention, the one or more power connection interface can comprise a female connection port adapted for receiving a complementary male connection interface of a standard charging cable, which connects at an opposite end to a portable electronic device. In other embodiments, the power connection interface can comprise a female swivel USB port increasing its connectivity, for example, when the charger is attached to one electronic device, but need to connect to a second electronic device via the port. In other embodiments, the power connection interface can comprise an adjustable cartridge such as a slide-and-pivot USB port which can be used as a female connection port adapted for receiving a complementary male connection interface of a standard charging cable or alternatively, as a male slide-and-pivot USB interface adapted for connecting into a female port of an electronic device. In other embodiments, the power connection interface can include a charging cable attached to the charger housing and preferably stored within a storage cavity in the charger housing when not in use. In preferred embodiments of the present invention, the portable power charger includes both wireless charging capabilities, and direct charging connectivity.

In additional embodiments the portable power charger of the present invention can be used to charge multiple electronic devices simultaneously, both via direct connection and wirelessly, as disclosed, for example in U.S. Pat. No. 9,318,915, which shares common inventors with the present invention, and which is incorporated herein by reference.

In various embodiments of the present invention, the portable power charger may further comprise a controller or processing unit, which can control wireless and direct connectivity with the potable power charger, keep track of the capacity level of the rechargeable battery, store data or provide a conduit means by which data can be exchanged between electronic devices, such as between a smart phone and a computer.

In various embodiments of the present invention, the charger unit may include a flashlight feature located on the surface of the housing unit to improve on the functionality of the charger.

These and other objects, features and advantages of the present invention will become apparent in light of the detailed description of embodiments thereof, as illustrated in the accompanying drawings.

BRIEF DESCRIPTION OF THE DRAWINGS

FIG. 1 shows a perspective view of a first embodiment of a portable power charger in accordance with the present invention.

FIG. 2 shows a planar front view of the portable power charger of FIG. 1.

DETAILED DESCRIPTION OF THE DRAWINGS

Figure 3:
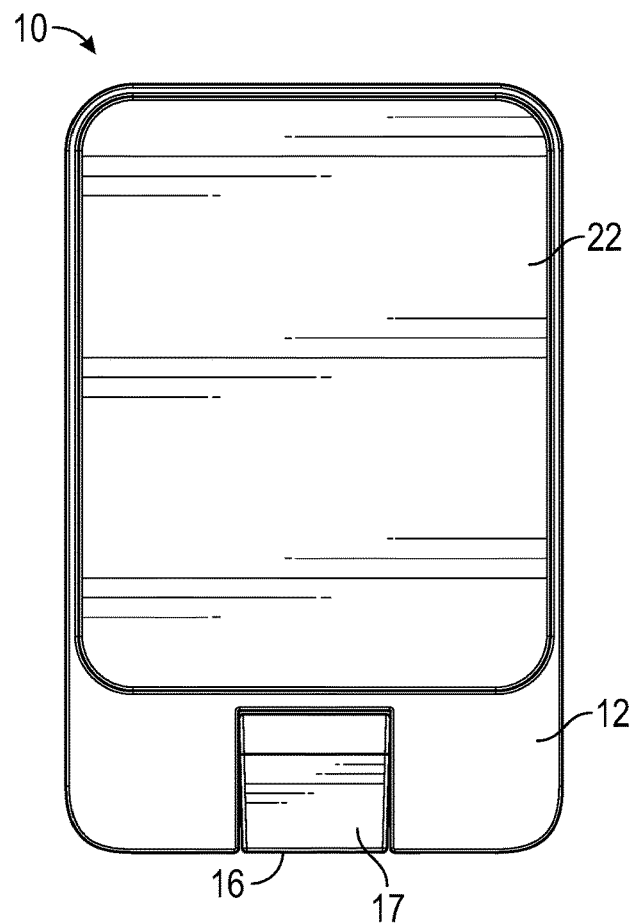
FIG. 3 shows a planar back view of the portable power charger of FIG. 1.

A portable power charger in accordance with an embodiment of the present invention is illustrated in FIGS. 1-5, and generally designated as reference numeral 10. The portable power charger 10 generally includes a charger housing having a rechargeable battery unit 14 internally disposed therein. The rechargeable battery unit 14 is generally illustrated in FIG. 6. The power charger 10 is designed for portability and convenient on-the-go use to recharge one or more mobile electronic devices and is designed to be attachable to an electronic device via various attachment means allowing for hands free carry and charge, while also allowing for easy detachment from the electronic device, once attached. The portable power charger 10 is also designed for easy and flexible recharging of the internal battery 14 from a variety of power sources so that it can be easily charged up to have sufficient battery capacity when it is needed to recharge an portable electronic device.

Preferably the rechargeable battery unit 14 of the portable power charger 10 is capable of being recharged in a variety of manners, including via direct connection and via wireless connection. For example, to charge the battery unit 14, the charger 10 may be connected with an external power source via a power input connector cable interface provided with the charger 10, via direct connection with an external power source via a separate connector cable that engages a power connection port interface provided on the charger housing 12, or via wireless power transmission means. A portable power charger in accordance with the present invention can include any or all of these recharging features in various combinations without departing from the principles and spirit of the present invention.

Similarly, the portable power charger 10 can be used to recharge one or more electronic device in a variety of manners, including via direct connection and via wireless connection. For example, to use the charger to recharge an electronic device, the charger 10 may be connected with an electronic device via a power output connector cable interface provided with the charger 10, via direct connection with an electronic device via a separate connector cable that engages a power connection port interface provided on the charger housing 12, or via wireless power transmission means. A portable power charger in accordance with the present invention can include any or all of these recharging features in various combinations without departing from the principles and spirit of the present invention.

Referring to the embodiment illustrated in FIGS. 1-6, the portable power charger 10 of the present invention has the capability of charging other devices or being recharged itself via direct connections, either using connector cables provided with and stored in the charger housing 12, or via separate connector cables attachable to the charger 10 via power connection ports provided on the charger housing 12. In this regard, the power charger 10 can be used on-the-go to charge one or more electronic devices by various means and combination of means.

Referring to FIG. 3, the portable power charger 10 includes an attachment means on a first surface of the charger housing 12 comprised of an attaching surface 22 that when pressed against the surface of an electronic device attaches the portable charger 10 to the electronic device allowing for hands free carry and charge. In an embodiment of the present invention, said attachment means consists of an adhesive patch 22 which allows the portable power charger 10 to remain stuck to the electronic device while charging but also allows for seamless removal when the charge is completed. Using the illustrated adhesive patch 22, the power charger 10 can be attached to a variety of electronic devices regardless of size.

Figure 8:
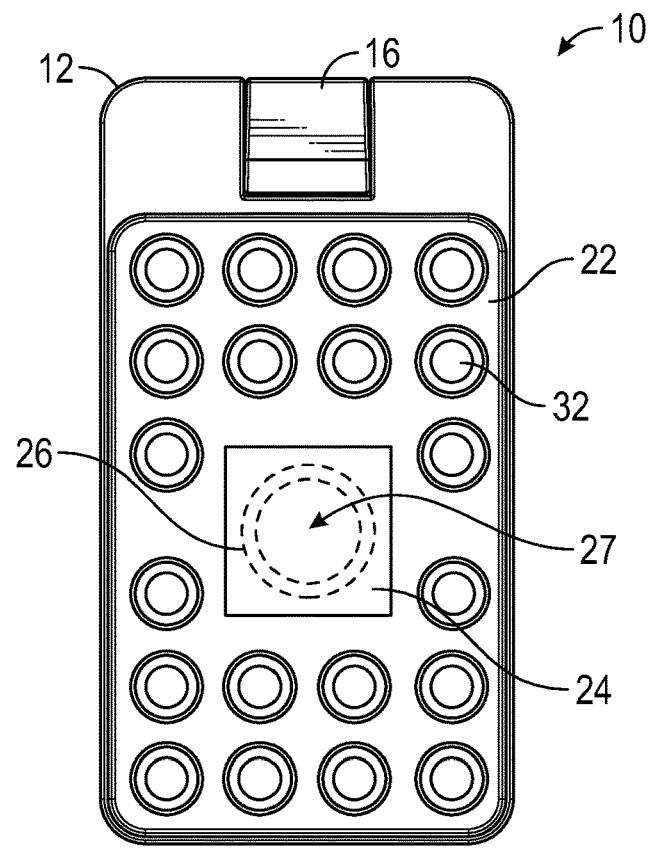
FIG. 8 shows a planar back view of the portable power charger of FIG. 7.

In an alternative embodiment, as shown in FIG. 8, the attachment means can consist of one or more suction cups 32 to attach the portable power charger 10 to the electronic device. In addition, the portable power charger 10 could be formed to act as a case for an electronic device itself, e.g., a mobile phone case, attaching to and around the electronic device via a snap fit connection when the electronic device is put inside the case. In addition to an adhesive patch and suction cups, the attachment means can utilize any known means of attaching to the electronic device without departing from the principles and spirit of the present invention, including but not limited to, clips or hook-and-loop connections.

Figure 5:
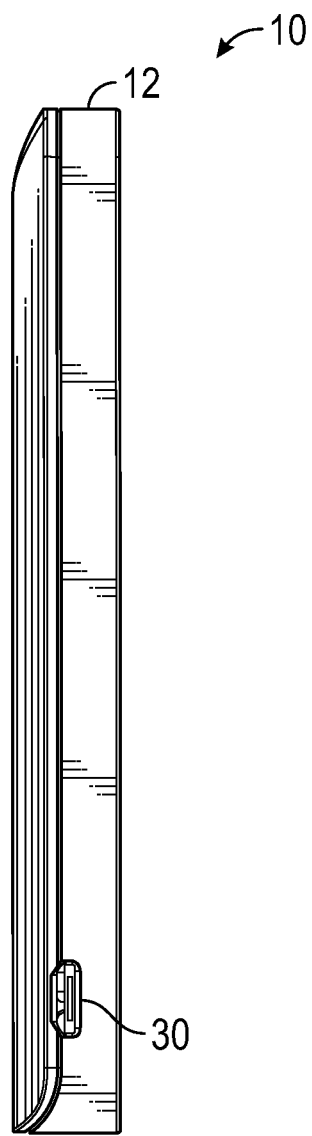
FIG. 5 shows a planar side view of the portable power charger of FIG. 1.
Figure 6:
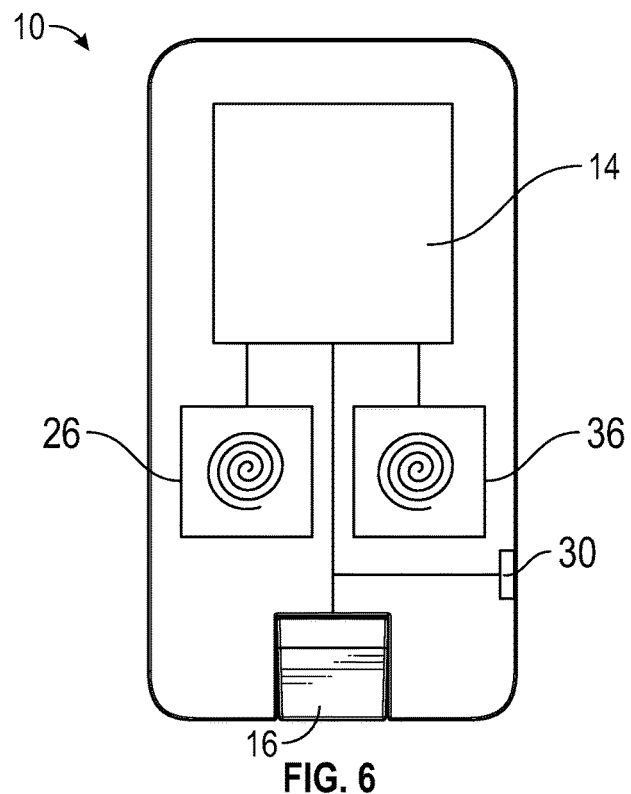
FIG. 6 shows a schematic diagram illustrating internal components of the portable power charger of FIG. 1.

Referring to FIG. 5, the portable power charger 10 may include a power connection input port 30 on the charger housing 12. The power connection input port 30 is operatively connected with the internal battery 14 to provided a charge to the internal battery 14 when the power charger 10 is connected to an external power source via the power connection input port 30. As shown, the power connection input port 30 comprises a micro-USB female interface, though the power connection input port 30 can utilize any known connection interface without departing from the principles and spirit of the present invention, including but not limited to a USB interface, a mini-USB interface, an AC-DC interface, or the like. In operation, a separate connector cable can be used to connect the power charger 10 with an external power source via the power connection input port 30.

Figure 4:
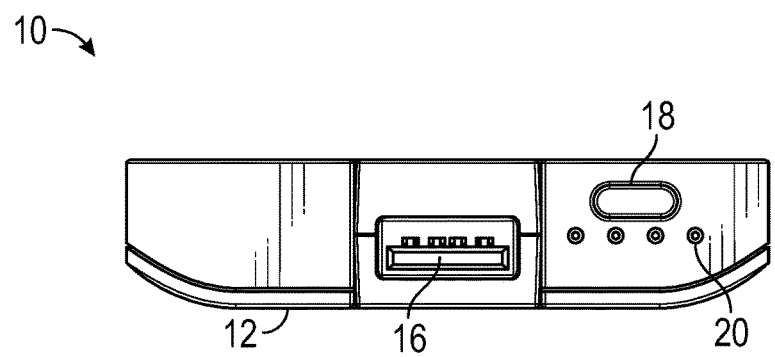
FIG. 4 shows a planar end view of the portable power charger of FIG. 1.
Figure 13:
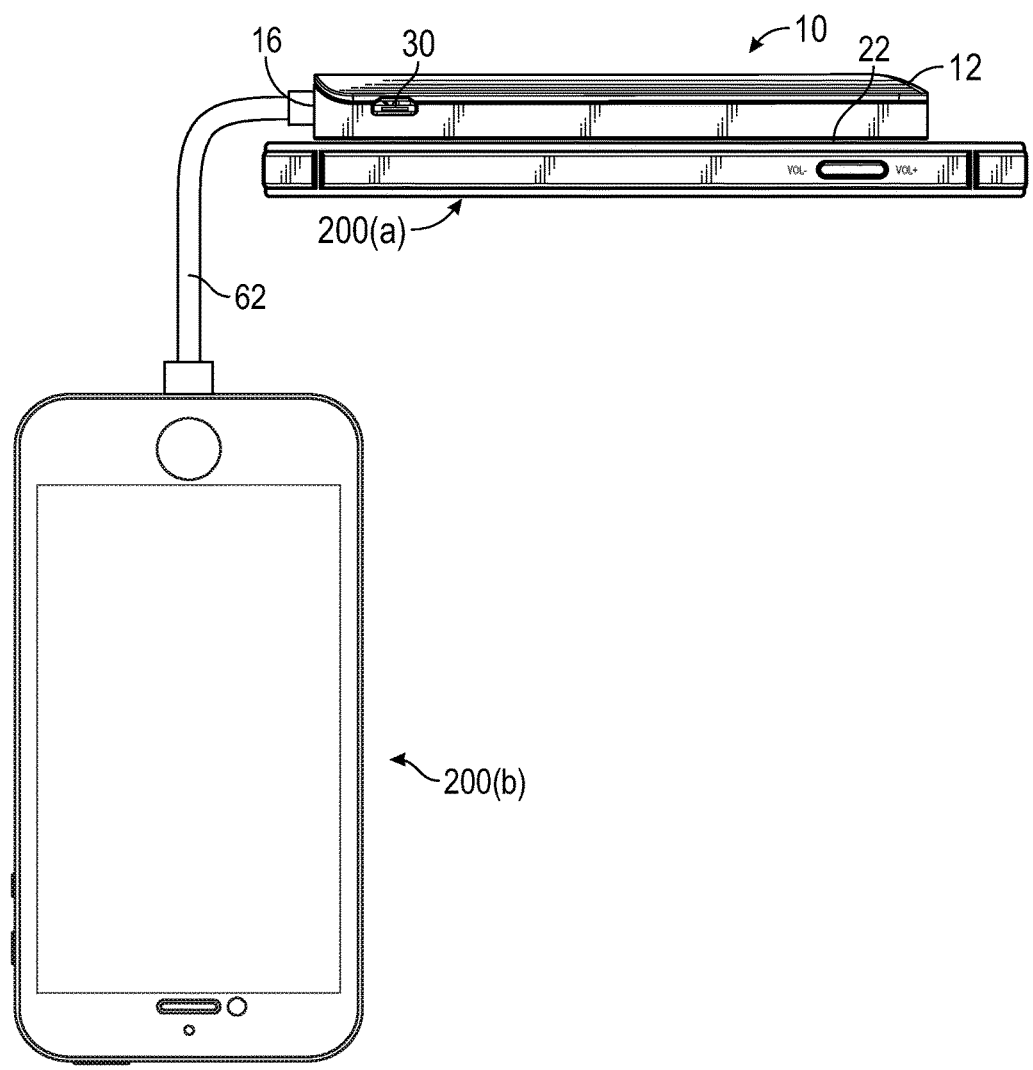
FIG. 13 shows a perspective view of an embodiment of a portable power charger for recharging multiple electronic devices in accordance with the present invention.

Referring to FIG. 4, a power connection output port 16 may also be provided on the charger housing 12. The power connection output port 16 is operatively connected with the internal battery 14 to provide a charge from the internal battery 14 to an electronic device when the portable power charger 10 is connected to an electronic device via a power connection output port 16. As shown, the power connection output port 16 comprises a USB female interface, though the power connection output port 16 can utilize any known connection interface without departing from the principles and spirit of the present invention, including but not limited to a micro-USB interface, a mini-USB interface, an AC-DC interface, and an adjustable cartridge capable of transforming from a USB female interface to a USB male interface depending on the position of the cartridge (as shown in FIG. 13 and described in further detail below), providing for power output or input or the like.

In operation, a separate connector cable can be used to connect the portable power charger 10 with an electronic device via the power connection output port 16. As shown in FIG. 4, a power capacity indicator means 20 is also provided to indicate the capacity of the internal battery unit 14, as will be described in more detail below.

As shown in FIG. 1, the power connection output port 16 is provided on a pivotable cartridge 17. In use, the cartridge 17 provides some flexibility for connecting a charging cable to the output port 16, especially, for example, when the charger is attached to an electronic device in the manner(s) described above. The pivoting of the cartridge 17 is particularly useful when the charger 10 is attached to an electronic device that is larger than the charger 10, making access to the output port 16 difficult if not for the pivotability of the cartridge 17, as shown.

Though the illustrated embodiment shows both a power connection input port 30 and a power connection output port 16, the present invention can use either means for power input or for power output. Further, the portable power charger 10 can use a power connection port that utilize a two-way charging interface, such as described in co-pending U.S. application Ser. No. 13/682,985, incorporated herein by reference, so that the port can act as both a power input and a power output, depending on what is connected to the port.

Figure 14A:
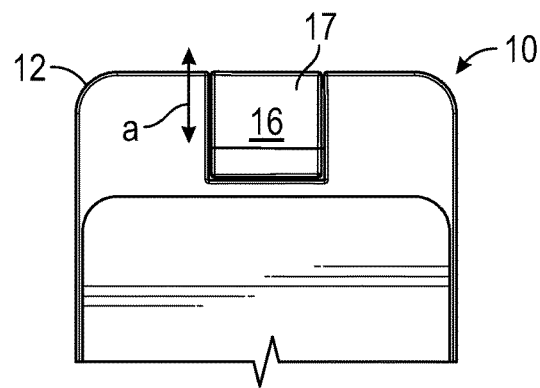
FIGS. 14a, 14b and 14c show partial planar back views of an embodiment of a power charger illustrating a slide-and-pivot power connection interface in accordance with the present invention.
Figure 14B:
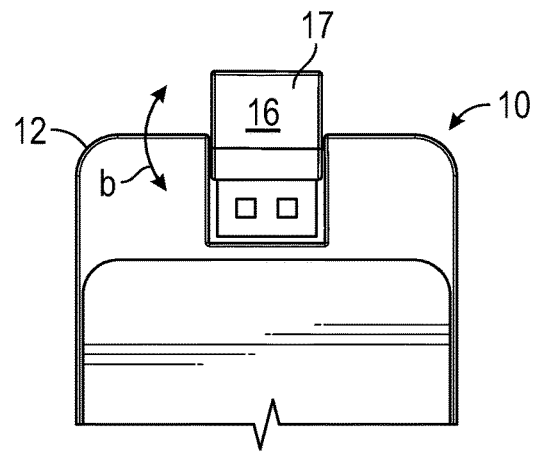
Figure 14C:
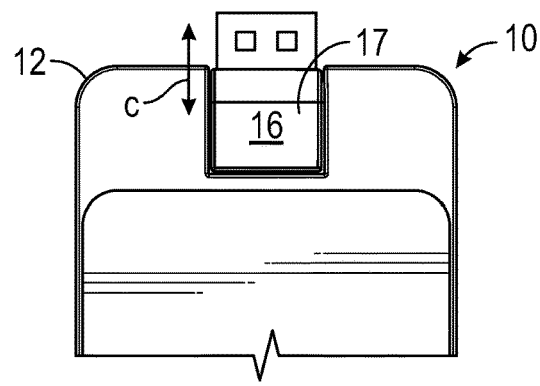

Referring to FIG. 14, an alternate design for a power connection interface is illustrated. As shown, the power connection interface 16 may be located within an adjustable cartridge 17 capable of transforming from a female connection port, as show in FIG. 14A, to a male connection interface, as shown in FIG. 14C, by first sliding the cartridge 17 out along arrow (a), then pivoting the cartridge 17 along arrow (b) to expose a male interface, and then sliding the cartridge 17 along arrow (c). In such a design, a storage cavity is formed in the charger housing for receiving the male interface when the cartridge 17 is positioned as shown in FIG. 14A. The adjustable cartridge 17 allows the connection interface 16 to be used as a female or male, input or output interface. In an alternate embodiment, the adjustable cartridge 17 can include only a male connection interface that can be stored when not in use as shown in FIG. 14A, and positioned for use, as needed, as shown in FIGS. 14B and 14C.

Figure 7:
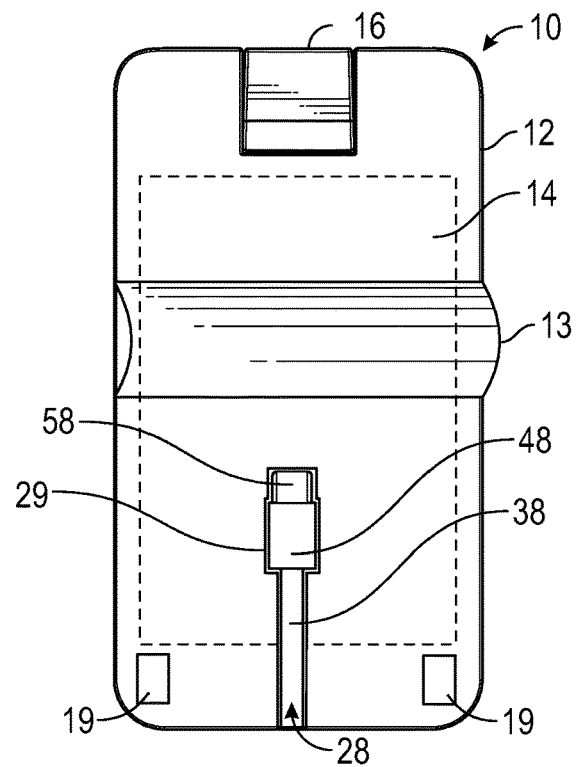
FIG. 7 shows a planar front view of a second embodiment of a portable power charger in accordance with the present invention.

A portable power charger in accordance with a second embodiment of the present invention is shown in FIGS. 7-10. Referring to FIG. 7, the portable power charger 10 may include one or more built-in power output connector cables 28 provided with the charger housing 12 for connecting the portable power charger 10 with electronic devices. The connector cable 28 is preferably stored within a respective cavity 29 formed in the charger housing 12 when not in use, and removed from the cavity 29 for use. The power output connector cable 28 is operatively connected with the internal battery 14 for providing a charge to a respective electronic device connected to the power charger 10 via the connector cable 28. As illustrated, the connector cable 28 comprise a cord portion 38 and a head portion 48 having a connection interface 58 designed for engagement with an electronic device or an adapter unit.

Figure 10:
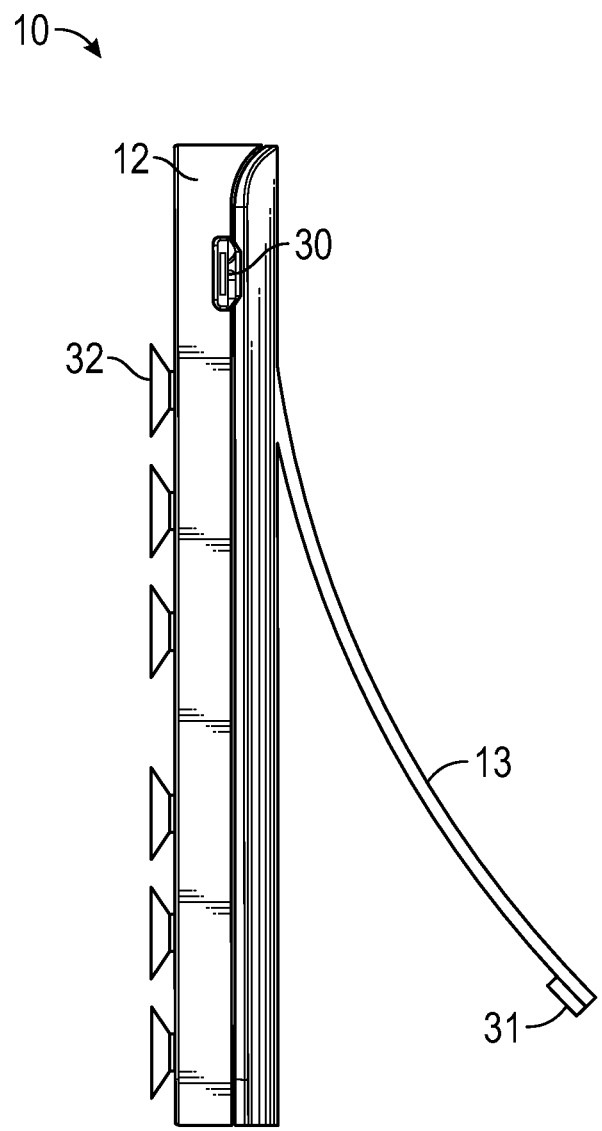
FIG. 10 shows a planar side view of the portable power charger of FIG. 7.

The cavity 29 for the connector cable 28 is preferably designed to have a complementary shape to the connector cable 28 so that the cable 28 can be stored within the general volume and footprint of the charger housing 12 when not in use. Referring to FIGS. 7 and 10, the charger housing 12 includes a flexible cover 13 (e.g., a leather or polyurethane cover) on its surface. The flexible cover 13 can be peeled or rolled back at one end to expose the output connector cable 28. When the cover 13 is laid flat, it covers and hides the connector cable 28. The charger housing 12 also houses hold-down pads 19, which may be magnets or hook-and-loop pads, or the like. The hold-down pads hold the flexible cover 13 in place for protection and aesthetics when it is not peeled or rolled back to expose the connector cable interface 28. Corresponding hold-down pads 31, which may be magnets or hook-and-loop pads, or the like, on the underside of the flexible cover 13 align with the hold-down pads 19 to hold the flexible cover 13 in place. In this regard, the existence of the connector cable interface 28 does not interfere with use of the portable power charger 10, and further does not detract from the size and appearance of the charger 10.

When the power output connector cable 28 is needed for use, it can be disengaged from its cavity 29 and extended away from the charger housing 12 so that the head portion 48 and interface 58 can engage an appropriate electronic device or adapter unit. The interface 58 can utilize any known connection interface without departing from the principles and spirit of the present invention. The cord portion 38 can be disengaged from the cavity to flex the connector cable interface 28 outwardly from the charger housing 12. Finger spaces (not shown) can be provided to assist the user to get a grip on the connector cable interface 28. Alternatively, the power output connector cable interface 28 can be retracted within the charger housing 12 to respective non-use positions, for example, using a spring-biased retraction mechanism as is generally known in the art.

Figure 12:
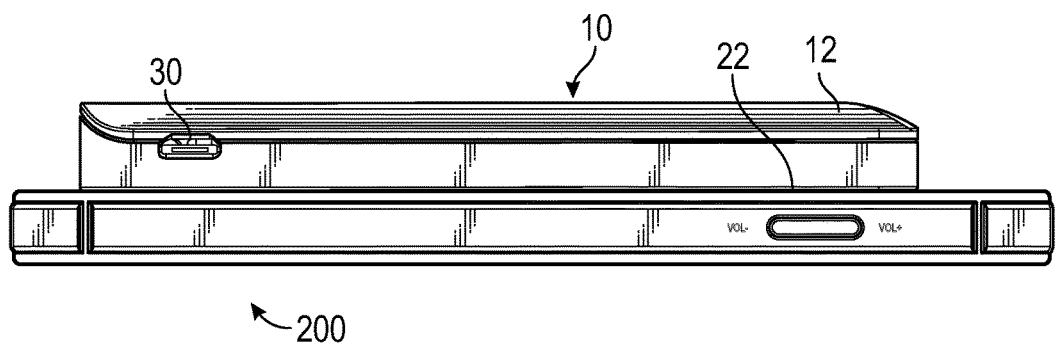
FIG. 12 shows a perspective view of an embodiment of a portable power charger for recharging an electronic device in accordance with the present invention.

The portable power charger 10 of the illustrated embodiments also has the capability of charging other devices via wireless power transmission, as shown in FIG. 12. In this regard, the portable power charger 10 includes a wireless transmitter 26 for transmitting a charge to an electronic device, as shown in FIGS. 6 and 8. In alternative embodiments, the portable power charger 10 may also include a wireless receiver for receiving a charge from a wireless charging mat or power transmitting device allowing the charger unit 10 to be recharged either wirelessly or via direct connection to an external power source, and at the same time be connected to multiple electronic devices by both wireless and direct connection means such as disclosed in U.S. Pat. No. 9,318,915, incorporated herein by reference.

Figure 9:
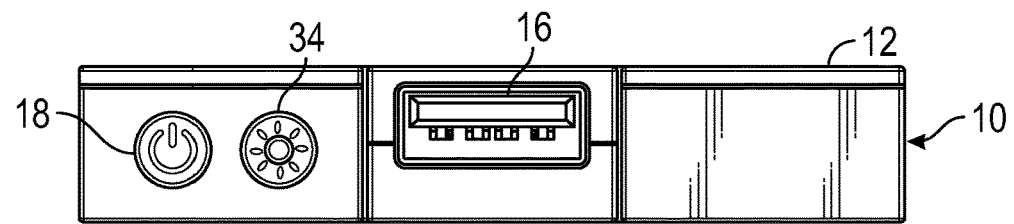
FIG. 9 shows a planar end view of the portable power charger of FIG. 7.

The wireless transmitter 26 of the portable power charger 10 generally comprises a magnetic induction coil operatively connected to the internal battery unit 14. Referring to FIG. 8, a wireless transmission area 27 generally aligned with the transmitter coil is illustrated. When an electronic device that includes a wireless receiver is aligned with the wireless transmission area 27, a magnetic field generated by the transmitter 26 is transmitted to the electronic device, where a voltage is induced to power the electronic device or recharge its internal battery. In this regard, the designated wireless transmission area 27 is visible to the user so as to facilitate proper alignment and wireless charging. Referring to FIG. 9, an exemplary charging indicator 34, usable in all the embodiments of the present invention may be provided to indicate that an electronic device is being wirelessly charged from the portable power charger 10. As illustrated, the charging indicator 34 is an LED light. The charging indicator 34 may glow in different colors according to power flow—e.g., red when charging the battery 14 via the input connection port interface 30; green when charging an electronic device from the battery 14 via the connection cable interface 28 or the power connection port interface 16; blue when charging a mobile device from the battery 14 via the wireless transmitter 26.

As with known wireless power transmission devices, such as wireless charging mats ascribing to wireless charging standardization efforts, the wireless transmitter of a charging device and the wireless receiver of a device to be charged typically must be aligned for the charge to be transferred. In this regard, the wireless charging transmitter 26 may be mounted in the charger housing 12 under a pressure-sensitive adhesive patch, shown in FIG. 3, or adhesive pad 24 (e.g., sticky reusable silicone rubber), shown in FIG. 8. In the embodiment of FIG. 8, suction cups 32 are distributed across the attaching surface 22 around the pressure-sensitive adhesive pad. The attaching surface 22 for a charger 10 in accordance with the present invention can utilize any known means of attaching to the electronic device or to the electronic device case, e.g., adhesive, clips, hook-and-loop, and the like, without departing from the principles and spirit of the present invention. In use, the adhesive patch 22 or the suction cups 32 are pressed flat against an electronic device or electronic device case to stick the portable power charger 10 onto the electronic device. The pressure-sensitive adhesive pad 24 also contacts the electronic device for additional stickiness. Contact of the attachment means with and against the electronic device places the wireless charging transmitter 26 in close proximity to a wireless charging receiver of the electronic device, enabling wireless power transfer from the portable power charger 10 to the electronic device and ensuring sufficient stick between the portable power charger 10 and the electronic device being recharged from the portable power charger 10 via wireless transmission means, as shown, for example, in FIG. 12.

As noted, a wireless receiver can also be provided in the charger 10. In operation, placing the charger 10 on a wireless transmission device, such as a wireless charging mat, so that the receiver aligns with a transmitter will recharge the internal battery 14 via a wireless connection. A receiver generally comprises a magnetic induction coil operatively connected to the internal battery 14 is generally illustrated in FIG. 6 as reference numeral 36.

Operation of the portable power charger 10 to transmit a wireless charge to an electronic device via direct connection means or via wireless transmission means 26 may be controlled by a power interface 18, such as an on/off button, as shown in FIGS. 4 and 9.

The wireless charging capabilities of the portable power charger 10 in accordance with the present invention are beneficial in that they improve upon the convenience provided by wireless charging technology. For example, a portable electronic device can be recharged on-the-go even when the proper charging connector or cable is not available. Indeed, the compact and portable design of the portable power charger 10 can permit charging of an electronic device in the user's pocket or purse simply by attaching the portable power charger 10 to the electronic device or electronic device case and ensuring that the electronic device is properly aligned with and proximate to the portable power charger. Additionally, once the portable power charger 10 is charged, a portable electronic device can be recharged without needing to be near an external power source, such as a wall socket, a car charger socket, an airplane charger socket, or a computer, which may not be readily available.

The portable power charger 10 of the present invention also permits recharging of multiple electronic devices via direct connection and wireless power transmission at the same time, as shown, for example, in FIG. 13 and described in further detail below. In addition, in various embodiments the portable power charger 10 can be used to recharge multiple electronic devices via direct connection and/or wireless power transmission at the same time as disclosed inn U.S. Pat. No. 9,318,915, incorporated herein by reference. Further, in various embodiments including both a wireless transmitter and a wireless receiver, the portable power charger 10 can transmit a charge while it is being recharged on a wireless charging mat, for example, as disclosed in U.S. Pat. No. 9,318,915.

In preferred embodiments of the present invention, the portable power charger 10 can be automatically turned on when an electronic device is connected to the portable power charger 10 via a power connector cable interface 28 or a power connection port interface 16. Further, the power charger 10 can use a power-off logic that automatically turns the charger 10 off after a predesignated time period, provided certain criteria have been met. Such a protocol is described in co-pending U.S. application Ser. No. 13/682,985, with is incorporated herein by reference, whereby the portable power charger 10 will automatically turn off after a predefined time delay after it is determined that the internal battery of all electronic devices connected to the portable power charger 10 are fully charged. Additionally, a manual power interface 18, such as the on/off button shown in FIGS. 4 and 9, can be provided to turn the power charger 10 on and off as desired.

Referring to FIG. 4, the charger housing 12 includes a power capacity indicator means 20 that indicates the remaining capacity of the internal battery 14 in the charger unit 10. In an embodiment of the present invention, as illustrated in FIG. 4, the power indicator means 20 comprises a series of lights, which can include more or fewer lights without departing from the principles and spirit of the present invention, that light up to indicate the power level of the internal battery 14. In operation, a processing unit disposed within the charger 10 communicates with the internal battery 14 to determine how much capacity is remaining in the battery 14. Upon determining the capacity level, the processing unit communicates with the power capacity indicator means 20 to provide the user with the appropriate signal for showing how much capacity is remaining in the internal rechargeable battery 14. For example, when the battery is at full capacity, all the lights in a series of lights will be lit up, or alternatively, a specific light associated with the "full" designation (F) will be lit up. As the battery power decreases, the lights correspondingly decrease by one, or alternatively, will switch as appropriate as the power is used. If there is no capacity left in the internal battery unit, none of the lights will be lit up, or alternatively, an "empty" indicator (E) may be lit up. For example, in an embodiment of the present invention, illustrated in FIG. 4, the power indicator means 20 comprises a series of four lights. When the internal battery 14 is at 76%-100% charge, all four of the lights will be lit up; when the battery is at 51% to 75% charge, three of the four lights will be lit up; when the battery is at 26% to 50% charge, two of the four lights will be lit up; and when the battery is >0% to 25% charge, one of the four lights will be lit up. The indicators may further be colored coordinated so that, for example, a green light corresponds to full battery capacity, a yellow light corresponds to half battery capacity, and a red light corresponds to an empty battery. Alternatively, a single light, can change color to indicate the power level. For example, when the charge is high, the light can be green; when the charge is medium, the light can be yellow, and when the charge is low or exhausted, the light can be red. Still further, the power capacity indicator means 20 can comprise a digital interface that provides a battery capacity level for the internal rechargeable battery 14, or any other known means of providing battery level information.

In operation, a portable power charger 10 in accordance with the present invention can be used in a variety of manners for recharging the power charger itself, as well as for recharging portable electronic devices. As a result of the compact size of the portable power charger 10 and the capacity of the built-in power bank, the portable power charger 10 can be used on-the-go to recharge a variety of electronic devices, including but not limited to smart phones, mobile phones, data tablets, music players, cameras, camcorders, gaming units, e-books, Bluetooth® headsets and earpieces, GPS devices, and the like, either individually or simultaneously in various combinations.

In preferred embodiments, the rechargeable battery 14 is preferably a Lithium-Ion battery that can be recharged by connecting the portable power charger 10 to an external power source, such as a computer, a wall socket, a car or an airplane power supply, or to a wireless power transmission device, such as a wireless charging mat. The rechargeable battery 14 is disposed within the charger housing 12 and is operatively connected with any and all input and output connector cable interfaces, input and output connector port interfaces, and any and all wireless receivers and wireless transmitters for receiving a charge from an external power source and transmitting a charge to one or more electronic devices connected to the portable power charger 10, either wirelessly or through power output means.

Figure 11:
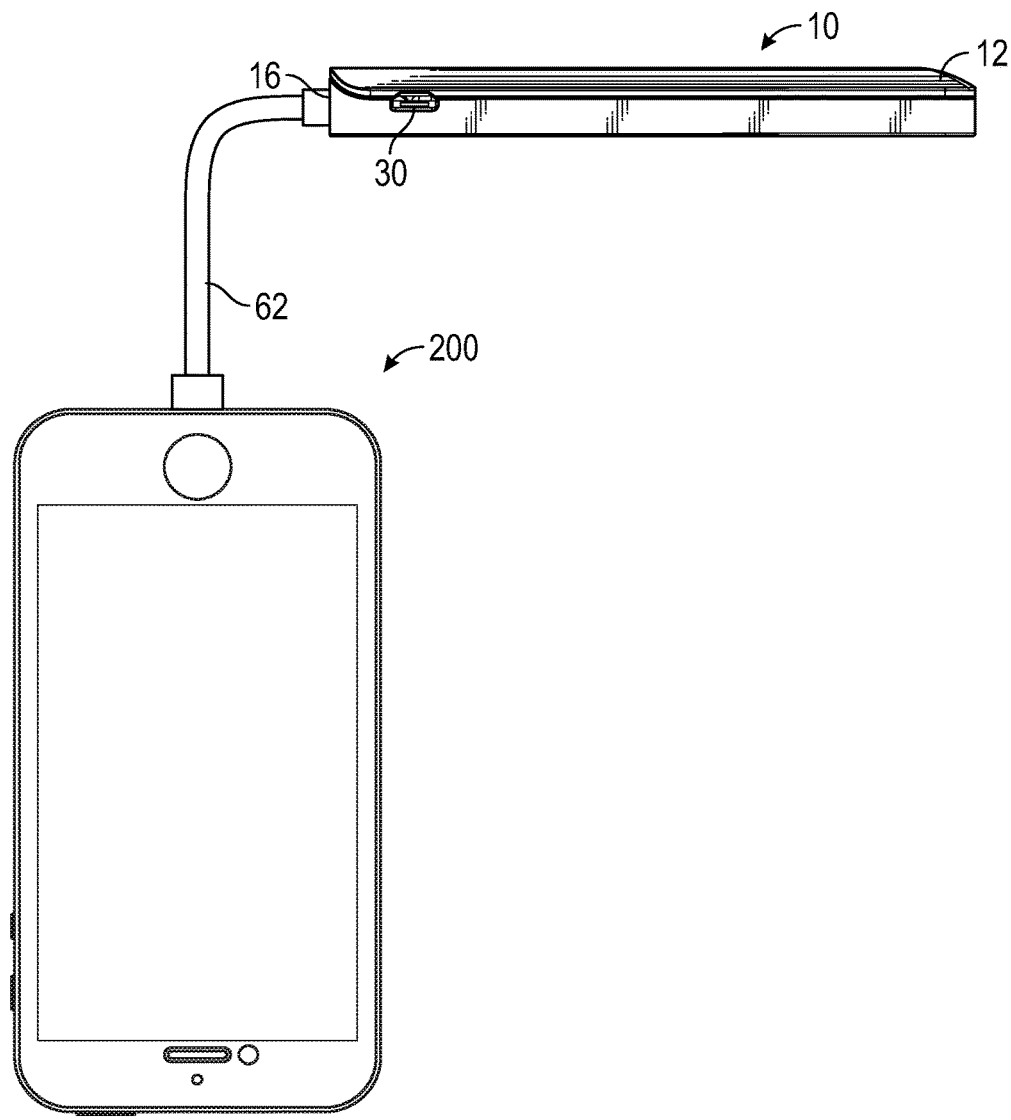
FIG. 11 shows a perspective view of an embodiment of a portable power charger for recharging an electronic device in accordance with the present invention.

As shown in FIG. 11, an electronic device 200, such as a smart phone, can be charged from the portable power charger 10 via a separate connector cable 62 used to interconnect the electronic device 200 with the portable power charger 10 via a power output connection port interface 16. Alternatively, for example, a built-in power output connector cable 28, as shown in FIG. 7 and described above, can be used to connect the electronic device 200 with the portable power charger 10.

Referring to FIG. 12, an electronic device 200, such as a smart phone, is wirelessly charged from the portable power charger 10 by attaching the attaching surface 22 of the portable power charger 10 to the surface of the phone 200 via an attachment means so that a charge is transmitted from the transmitter 26 of the power charger 10 to a wireless receiver of the phone 200. As so connected, the transmitter 26 is aligned with the receiver of the phone 200 so as to facilitate and maximize wireless charging with little effort.

Referring to FIG. 13, the portable power charger 10 in accordance with the present invention can be used to recharge multiple electronic devices simultaneously. For example, an electronic device 200a can be recharged via wireless connection with the portable power charger 10, while another electronic device 200b is recharged via direct connection with the power charger 10 through a separate connector cable 62, as shown in FIG. 13, or a built-in power output connector cable interface 28, as shown in FIG. 7.

The charger housing 12 encloses various electrical components (such as integrated circuit chips and other circuitry) to provide computing operations for the device. The integrated circuitry and other components may comprise a power supply (e.g., the internal rechargeable battery), a microprocessor and controller (e.g., a CPU), memory (e.g., ROM, RAM, flash), a circuit board, a hard drive, and/or various input/output (I/O) support circuitry. The electrical components may also include components for sending and receiving data and media (e.g., antenna, receiver, transmitter, transceiver, etc.), in addition to wireless transmission of power.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A portable power charger for recharging at least one electronic device having a rechargeable internal battery, said portable power charger comprising:
    a charger housing internally storing a rechargeable battery, said charger housing having a generally planar first surface having a first area;
    an attachment means on the first surface of said housing for attaching the charger housing to an electronic device, wherein said attachment means do not inhibit attachment to an electronic device having an effective planar area that is bigger or smaller than the first area; and
    at least one power connection interface operatively connected to the rechargeable battery capable of operating as at least one of a power input and a power output, wherein when said at least one power connection interface acts as a power input, an electrical charge current is provided from an external power source to the portable power charger for recharging the rechargeable battery when the portable power charger is connected to said external power source via said at least one power connection interface, and wherein when said at least one power connection interface acts as a power output, a charge is provided from the rechargeable battery of the portable power charger to an electronic device to recharge the rechargeable battery of said electronic device when said electronic device is connected to the portable power charger via said at least one power connection interface.

2. The portable power charger of claim 1, wherein said attachment means comprises an adhesive patch.

3. The portable power charger of claim 1, wherein said attachment means comprises at least one suction cup.

4. The portable power charger of claim 1, further comprising a wireless transmitter disposed within the charger housing and operatively connected to the rechargeable battery capable of wireless transmitting power to an electronic device.

5. The portable power charger of claim 1, further comprising a wireless receiver disposed within the charger housing and operatively connected to the rechargeable battery for receiving power transmitted from a wireless transmitting device and directing said power to the rechargeable battery for recharging.

6. The portable power charger of claim 1, wherein said at least one power connection interface comprises at least one of a power connection port and a power connection cable operatively connected to the rechargeable battery.

7. The portable power charger according to claim 6, wherein said power connection cable is stored within a storage cavity formed in the opposing surface of said charger housing.

8. The portable power charger according to claim 7, wherein said storage cavity is covered by a flexible cover, included on said opposing surface of said charger housing.

9. A portable power charger for recharging at least one electronic device having a rechargeable internal battery, said portable power charger comprising:
    a charger housing internally storing a rechargeable battery;
    an attachment means on a first surface of said housing for attaching the charger housing to an electronic device; and
    at least one power connection interface operatively connected to the rechargeable battery capable of operating as at least one of a power input and a power output, wherein when said at least one power connection interface acts as a power input, an electrical charge current is provided from an external power source to the portable power charger for recharging the rechargeable battery when the portable power charger is connected to said external power source via said at least one power connection interface, and where when said at least one power connection interface acts as a power output, a charge is provided from the rechargeable battery of the portable power charger to an electronic device to recharge the rechargeable battery of said electronic device when said electronic device is connected to the portable power charger via said at least one power connection interface, and
    wherein said at least one power connection interface is located within an adjustable cartridge connected to the charger housing.

10. The portable charger of claim 9, wherein said at least one power connection interface comprises a female power connection port on one face of the adjustable cartridge and a male power connection interface on the opposing face of the adjustable cartridge, and wherein said adjustable cartridge is capable of transforming said connection interface from the female connection port to the male connection interface, and from the male connection interface to the female connection port, depending on the position of said adjustable cartridge.

11. The portable power charger of claim 9, wherein said attachment means comprises an adhesive patch.

12. The portable power charger of claim 9, further comprising a wireless transmitter disposed within the charger housing and operatively connected to the rechargeable battery capable of wireless transmitting power to an electronic device.

13. The portable power charger according to claim 9, further comprising a power connection cable that is stored within a storage cavity formed in the opposing surface of said charger housing.

14. A portable power charger for recharging at least one electronic device having a rechargeable internal battery, said portable power charger unit comprising:
    a charger housing internally storing a rechargeable battery, said charger housing having a generally planar first surface having a first area;
    an attachment means on the first surface of said housing for attaching the charger housing to an electronic device, wherein said attachment means do not inhibit attachment to an electronic device having an effective planar area that is bigger or smaller than the first area; and
    a wireless transmitter operatively connected to the rechargeable battery capable of wireless transmitting power to the electronic device attached thereto via the attachment means.

15. The portable power charger according to claim 14, further comprising at least one power connection interface operatively connected to the rechargeable battery capable of operating as at least one of a power input and a power output, wherein when said at least one power connection interface acts as a power input, an electrical charge current is provided from an external power source to the portable power charger for recharging the rechargeable battery when the portable power charger is connected to said external power source via said at least one power connection interface, and wherein when said at least one power connection interface acts as a power output, a charge is provided from the rechargeable battery of the portable power charger to an electronic device to recharge the rechargeable battery of said electronic device when said electronic device is connected to the portable power charger via said at least one power connection interface.

16. The portable power charger of claim 14, wherein said attachment means comprises an adhesive patch.

17. The portable power charger of claim 14, wherein said attachment means comprises at least one suction cup.

18. The portable power charger of claim 14, further comprising a wireless receiver disposed within the charger housing and operatively connected to the rechargeable battery for receiving power transmitted from a wireless transmitting device and directing said power to the rechargeable battery for recharging.

19. A portable power charger for recharging at least one electronic device having a rechargeable internal battery, said portable power charger unit comprising:
 a charger housing internally storing a rechargeable battery, said charger housing having a generally planar first surface having a first area;
 an attachment means on the first surface of said housing for attaching the charger housing to an electronic device, wherein said attachment means do not inhibit attachment to an electronic device having an effective planar area that is bigger or smaller than the first area;
 at least one power connection interface operatively connected to the rechargeable battery capable of operating as at least one of a power input and a power output, wherein when said at least one power connection interface acts as a power input, an electrical charge current is provided from an external power source to the portable power charger for recharging the rechargeable battery when the potable power charger is connected to said external power source via said at least one power connection interface, and wherein when said at least one power connection interface acts as a power output, a charge is provided from the rechargeable battery of the portable power charger to an electronic device to recharge the rechargeable battery of said electronic device when said electronic device is connected to the portable power charger via said at least one power connection interface;
 a wireless transmitter operatively connected to the rechargeable battery capable of wireless transmitting power to an electronic device; and
 a wireless receiver operatively connected to the rechargeable battery for receiving power transmitted from the wireless transmitting device and directing said power to the rechargeable battery for recharging.

20. The portable power charger of claim 19, wherein said attachment means comprises an adhesive patch.

21. The portable power charger of claim 19, wherein said attachment means comprises at least one suction cup.

22. The portable power charger of claim 19, wherein said at least one power connection interface comprises at least one of a power connection port and power connection cable operatively connected to the rechargeable battery.

\* \* \* \* \*